United States Patent
Friedrich et al.

[19]

[11] Patent Number: 6,110,230
[45] Date of Patent: Aug. 29, 2000

[54] USE OF CARBOXYAMIDE-POLYSILOXANES FOR WATER PROOFING LEATHER

[75] Inventors: Holger Friedrich, Bobenheim-Roxheim; Michael Kneip, Ludwigshafen; Bernd Leutner, Frankenthal, all of Germany

[73] Assignee: BASF Aktiengesellschaft, Ludwigshafen, Germany

[21] Appl. No.: 09/297,920

[22] PCT Filed: Nov. 13, 1997

[86] PCT No.: PCT/EP97/06348

§ 371 Date: Jul. 16, 1999

§ 102(e) Date: Jul. 16, 1999

[87] PCT Pub. No.: WO98/21369

PCT Pub. Date: May 22, 1998

[30] Foreign Application Priority Data

Nov. 13, 1996 [DE] Germany ............... 196 46 916

[51] Int. Cl.⁷ ......................................... C14C 9/00
[52] U.S. Cl. ............... 8/94.14; 8/94.18; 8/94.23; 8/94.1 R
[58] Field of Search ............... 524/838; 8/94.23, 8/94.1 R, 94.14, 94.18

[56] References Cited

U.S. PATENT DOCUMENTS

| | | | |
|---|---|---|---|
| 4,931,062 | 6/1990 | Bay et al. | 8/94 |
| 5,385,999 | 1/1995 | D'Anvers et al. | 528/21 |
| 5,702,490 | 12/1997 | Kneip et al. | 8/94 |

FOREIGN PATENT DOCUMENTS

| | | |
|---|---|---|
| 95676 | 7/1983 | European Pat. Off. . |
| 095676 | 12/1983 | European Pat. Off. . |
| 324345 | 7/1989 | European Pat. Off. . |
| 342834 | 11/1989 | European Pat. Off. . |
| 4240274 | 6/1994 | Germany . |
| 4404890 | 8/1995 | Germany . |

OTHER PUBLICATIONS

Pinteala et al., *Polymer Bulletin*, 32, 1994, pp. 173–178.

*Primary Examiner*—Margaret Einsmann
*Attorney, Agent, or Firm*—Keil & Weinkauf

[57] ABSTRACT

Specific carboxyamide-polysiloxanes of the formula IV

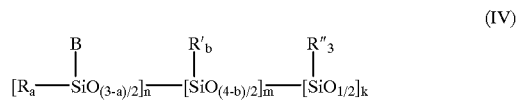

or the formula IVa

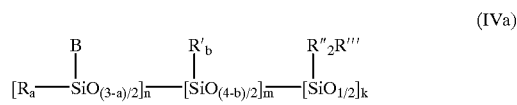

having a carboxyl content of from 0.02 to 1.0 mmol/g and an average molar mass (number average) [$M_n$] in the range from $2\times10^3$ to $60\times10^3$ g/mol are used for hydrophobicizing materials of fibrous structure, especially leather or fur skins.

6 Claims, No Drawings

USE OF CARBOXYAMIDE-POLYSILOXANES FOR WATER PROOFING LEATHER

The invention relates to the use of carboxyamide-polysiloxanes of the formula IV

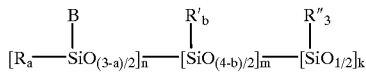
(IV)

in which R, R' and R", each independently, are selected from $C_{1-6}$-alkyl or phenyl, or carboxyamide-polysiloxanes of the formula IVa

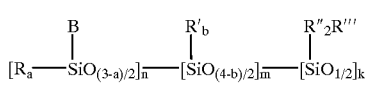
(IVa)

wherein R' and R", each independently, are selected from $C_{1-6}$-alkyl, $C_{1-6}$-alkoxy, OH or phenyl, and the number of types of structural units defined by

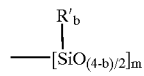

is at least one and a is selected from the range $0 \leq a \leq 2$ and b is selected from the range $1 \leq b \leq 3$, and the number of repetitions of the types of structural units which is defined by the variables m, n and k is selected from the ranges $1 \leq n \leq 60$,
$20 \leq m \leq 800$ and
$0 \leq k \leq \{(2-b)m+[(1-a)n+2]\}$,
B is an organic radical of the formula V

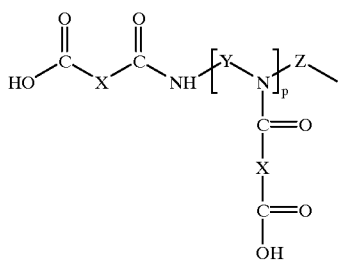
(V)

in which p=0–10 and
Y and Z, each independently, are a divalent hydrocarbon radical from the group of aliphatic hydrocarbons or are a divalent alkoxyalkyl radical, and
X is a divalent hydrocarbon radical from the group of $-(CH_2)_y-$ where $2 \leq y \leq 6$,
$-CH_2-CHR^5-$ or $-CHR^5-CH_2-$ with $R^5$ $C_{1-20}$-alkyl or $C_{2-20}$-alkenyl $-CH=CH-$, cyclic or bicyclic, saturated or unsaturated hydrocarbons or the aromatic hydrocarbons, where optionally some of the substituents B are replaced by the substituents A of the following formula II

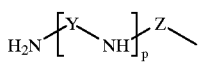
(II)

in which Y, p and Z are as defined above, or by the substituents C of the following formula VII

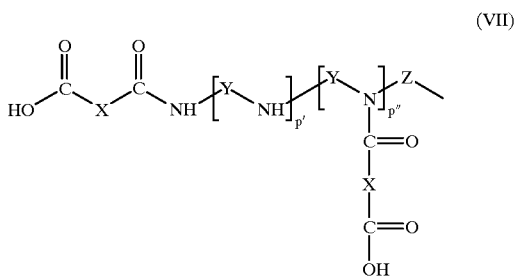
(VII)

in which p'+p"=p and X, Y and Z are as defined above,
the carboxyamide-polysiloxanes of the above formula IV or IVa having a carboxyl content of from 0.02 to 1.0 mmol/g and a molar mass in the range from $2 \times 10^3$ to $60 \times 10^3$ g/mol,
for hydrophobicizing materials of fibrous structure, especially leather or fur skins.

In the hydrophobicizing of leather, use is generally made of silicone oils and functional siloxanes. In this context, carboxyl-containing polysiloxanes are preferably used. The term "carboxyl-containing" refers here and below both to undissociated COOH groups and to COO⁻ groups afterdissociation. When these compounds are used, the leather can be treated in an aqueous liquor. Moreover, aftertreatment with metal salts, and the use of emulsifiers and solvents, are unnecessary. Such carboxyl-containing polysiloxanes are described in DE-A 35 29 869, DE-A 38 00 629 and WO-A 95/22627.

The service properties and performance results of such silicone oil emulsions, however, are still not optimal. Further improvements are desirable, in particular, in the stability of the emulsions during storage. Moreover, the strength of the hydrophobicizing effect and its durability when the known carboxyl-containing polysiloxanes are used is unsatisfactory. Furthermore, an improvement is desirable in the compatibility with paraffin oil emulsions as are used in the hydrophobicizing of leather. The carboxyl-containing polysiloxanes described in the abovementioned documents have the further disadvantage that they are of limited availability on the industrial scale and, in addition, are expensive.

Functional siloxanes which are more easily obtainable are aminoalkyl-functional siloxanes (also referred to below as aminosiloxanes). Moreover, they are in many cases economically more favorable than the carboxyl-containing polysiloxanes. When the aminosiloxanes are used for hydrophobicizing or impregnating leather, however, it has been found that their suitability for this application is limited. In particular, their hydrophobicizing effect is much poorer. Furthermore, the adhesion of the aminosiloxanes to chrome-tanned leather is very low, so that the durability of the hydrophobicizing effect also leaves much to be desired. Yet another disadvantage which has been found is that the use of aminosiloxanes causes unwanted yellowing.

DE-A 42 14 150 discloses a process for hydrophobicizing materials of fibrous structure using sulfosuccinic esters of reactive siloxanes.

EP-A 0 095 676 and polymer bulletin 32, pages 173–178 (1994) disclose the conversion of aminoalkylsiloxanes to carboxyamide-polysiloxanes. Such carboxyamide-polysiloxanes are also referred to as carboxy-functionalized aminoalkylsiloxanes. According to EP-A 0 095 676, such carboxyamide-polysiloxanes are used for textiles and woven fabrics. They impart to these materials a certain degree of softness and water repellency. Furthermore, these compounds can also be employed as release agents or lubricants for metallic substrates.

It is an object of the invention, in view of what has been said above, to provide hydrophobicizing agents for leather which are improved in terms of cost-effectiveness and the strength and durability of the hydrophobicizing effect relative both to the carboxyl-containing polysiloxanes known to date and to the aminoalkyl-functional siloxanes We have found that this object is achieved by the use of carboxyamide-polysiloxanes of the formula IV

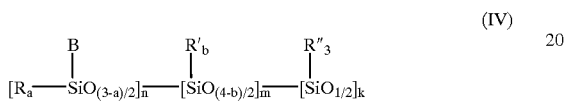
(IV)

in which R, R' and R'', each independently, are selected from $C_{1-6}$-alkyl or phenyl, or carboxyamide-polysiloxanes of the formula IVa

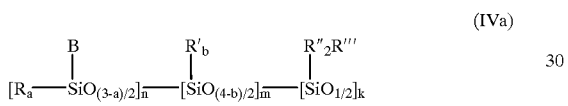
(IVa)

wherein R' and R'', each independently, are selected from $C_{1-6}$-alkyl, $C_{1-6}$-alkoxy, OH or phenyl, and the number of types of structural units defined by

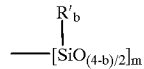

is at least one and a is selected from the range $0 \leq a \leq 2$ and b is selected from the range $1 \leq b \leq 3$, and the number of repetitions of the types of structural units which is defined by the variables m, n and k is selected from the ranges $1 \leq n \leq 60$, preferably $1 \leq n \leq 10$
$20 \leq m \leq 800$, preferably $20 \leq m \leq 150$ and
$0 \leq k \leq \{(2-b)m+[(1-a)n+2]\}$, B is an organic radical of the formula V

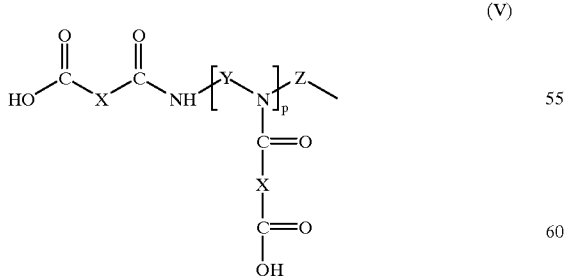
(V)

in which p=0–10, preferably 0 or 1, and
Y and Z, each independently, are a divalent hydrocarbon radical from the group of aliphatic hydrocarbons or are a divalent alkoxyalkyl radical, and X is a divalent hydrocarbon radical from the group of —$(CH_2)_y$— where $2 \leq y \leq 6$, preferably $2 \leq y \leq 4$, —$CHR^5$—$CH_2$—, —$CH_2$—$CHR^5$— with $R^5$ $C_{1-20}$-alkyl or $C_{2-20}$-alkenyl —CH=CH—, cyclic or bicyclic, saturated or unsaturated hydrocarbons or the aromatic hydrocarbons, where optionally some of the substituents B are replaced by the substituents A of the following formula II

(II)

in which Y, p and Z are as defined above, or by the substituents C of the following formula VII

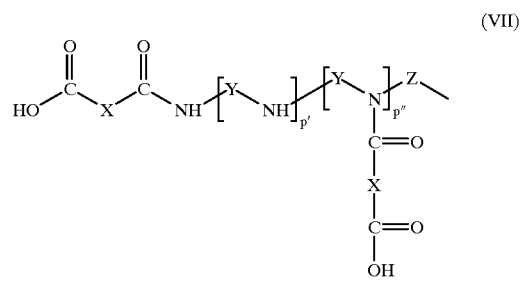
(VII)

in which p'+p''=p and X, Y and Z are as defined above, the carboxyamide-polysiloxanes of the above formula IV or IVa having a carboxyl content of from 0.02 to 1.0 mmol/g and a molar mass in the range from $2 \times 10^3$ to $60 \times 10^3$ g/mol,
for hydrophobicizing materials of fibrous structure, especially leather or fur skins.

The molar mass refers, hereinbelow, to the average molar mass (number average) $[M_n]$.

A preferred achievement of the object constitutes the use of the abovementioned carboxyamide-polysiloxanes in which B is an organic radical of the formula V

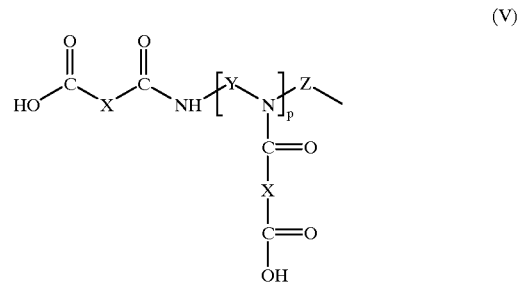
(V)

in which p=0 or 1, X=—$CH_2CH_2$—, —$CHR^5$—$CH_2$—, —$CH_2$—$CHR^5$— with $R^5$ $C_{1-20}$-alkyl or $CH_{2-20}$-alkenyl —CH=CH— or

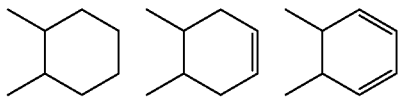

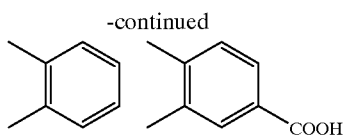

and Y=—CH$_2$CH$_2$— and Z=—CH$_2$CH$_2$CH$_2$—.

The carboxy-functional siloxane copolymers, or carboxyamide-polysiloxanes, obtained for the use according to the invention by reacting the aminofunctional siloxanes of the formula I

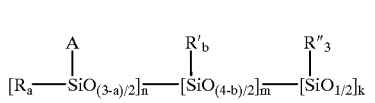

(I)

in which R, R' and R", each independently, are selected from C$_{1-6}$-alkyl or phenyl, or carboxyamide-polysiloxanes of the formula Ia

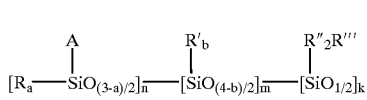

(Ia)

wherein R' and R", each independently, are selected from C$_{1-6}$-alkyl, C$_{1-6}$-alkoxy, OH or phenyl, and the number of types of structural units defined by

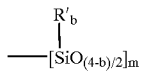

is at least one and a is selected from the range $0 \leq a \leq 2$ and b is selected from the range $1 \leq b \leq 3$, and the number of repetitions of the types of structural units which is defined by the variables m, n and k is selected from the ranges $1 \leq n \leq 60$,
$20 \leq m \leq 800$ and
$0 \leq k \leq \{(2-b)m+[(1-a)n+2]\}$ and A is an organic radical of the formula II

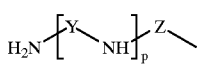

(II)

with the dicarboxylic anhydrides of the formula III

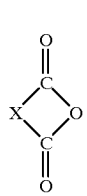

(III)

in which X is a divalent hydrocarbon radical from the group of —(CH$_2$)$_y$— where $2 \leq y \leq 6$, —CH$_2$—CHR$^5$—CH$_2$— or —CHR$^5$—CH$_2$— with R$^5$ C$_{1-20}$-alkyl, preferably C$_{5-15}$-alkyl or C$_{2-20}$-alkenyl, preferably C$_{5-15}$-alkenyl, especially oct-2-enyl —CH=CH—, cyclic or bicyclic, saturated or unsaturated hydrocarbons, or the aromatic hydrocarbons have a structure in accordance with the following formula IV or the above formula IVa:

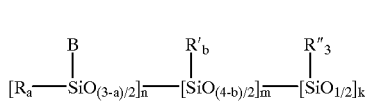

(IV)

in which R, R', R", m, n, a, b and k are as already defined, and B is an organic radical of the following formula V

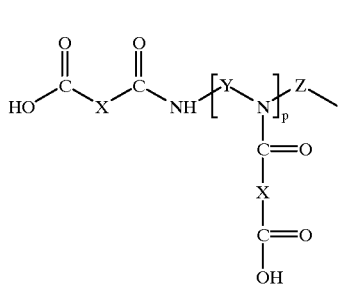

(V)

in which p, X, Y and Z are likewise as defined above.

Preferred aminofunctional siloxanes can be prepared from the following compounds 1, 2 and 3:

A—SiR"$_g$R$_{3-g}$ (1)

cyclic (SiR'$_2$—O—)$_h$ (2a) or linear HO—(SiR'$_2$—O—)$_h$H or R'$_3$Si—O—(SiR'$_2$—O—)$_h$SiR'$_3$ (2b)

R"$_3$Si—O—SiR"$_3$ (3)

with g=0–3, i.e. 0, 1, 2 or 3, preferably 0 or 3
h=3–10, preferably 3–5
and the above meaning of A, R, R' and R"

R' and R" preferably C$_{1-3}$-alkyl, especially methyl. R is preferably C$_{1-3}$-alkoxy, especially methoxy, ethoxy or OH.

The compounds are reacted under basic conditions, preferably in presence of KOH.

In the case g=0, R=OCH$_3$, R'=CH$_3$, R"=CH$_3$ the following basic building blocks result for the siloxane:

(CH$_3$)$_3$Si—O$_{1/2}$, (CH$_3$)$_2$Si(O$_{1/2}$)$_2$, CH$_3$Si(O$_{1/2}$)$_3$, (CH$_3$)$_2$(CH$_3$O)Si—O$_{1/2}$,

A—Si(OCH$_3$)$_2$(O$_{1/2}$), A—Si(OCH$_3$)(O$_{1/2}$)$_2$, A—Si(O$_{1/2}$)$_3$.

In the aminofunctional siloxanes thus obtained the amine number is preferably 0,1 to 0,5 meq/g. The molar ratio of (1) to (2)/h is preferably 0,00375 to 0,0375.

Instead of compound (1) the corresponding amidized compound B—SiR"$_g$R$_{3-g}$ can be used.

Compound (1) is used for functionalization, compound (2) for forming the chain and compound (3) for termination.

The amino-functional siloxanes employed have a viscosity in the range from 20 mm$^2$/s to 10,000 mm$^2$/s. This corresponds approximately to a molar mass in the range from 2×10$^3$ to 60×10$^3$ g/mol. Where aminosiloxanes are employed whose viscosity is above the stated range, the carboxyamide-polysiloxanes obtained therefrom in most cases do not have satisfactory properties. In particular, the products are in that case frequently not homogeneous and/or can no longer be stirred because of their high viscosity. If, on the other hand, the molar mass of the aminosiloxane employed falls below the stated range, then the hydrophobicizing effect on leather of the carboxyamide-polysiloxane prepared is poor and/or its processability is unsatisfactory. Preferably employed aminosiloxanes have a viscosity in the range from 50 to 500 mm$^2$/s.

The carboxyamide-polysiloxanes used in accordance with the invention have a carboxyl content of from 0.02 to 1.0 mmol/g, but preferably from 0.2 to 0.5 mmol/g. The term carboxyl relates in this case to the free—dissociated or undissociated—carboxylic acid functions.

Some of the organic radicals of the formula V represented by B can be replaced by the radicals A of formula II above and/or by radicals C of formula VIS above. Such products are formed as a result of not fully stoichiometric reaction of the amino groups in the side chains of the polysiloxane with the dicarboxylic anhydrides of the formula III. In this case, it is advantageous to employ 0.4–1 mol of acid anhydride per mole equivalent of amine.

Where 0.5 mol or less of acid anhydride is employed per mole equivalent of amine, the use of an amine for neutralization can be dispensed with in the subsequent preparation of the aqueous dispersion. For example, when 1 g of an aminoalkylsiloxane containing 0.3 mmol/g of $NH_2$—$CH_2CH_2NHCH_2CH_2CH_2$—radicals is reacted with 0.15 mmol of an acid anhydride, a siloxane with the following functional radical is obtained:

HOOC—X—CO—NH—$CH_2CH_2NHCH_2CH_2CH_2$—

=$^-$OOC—X—CO—$NH_2$—$CH_2CH_2NH^+_2CH_2CH_2CH_2$
(radical written as zwitterion)

The reaction products of the formula IV or IVa above are preferably employed, for hydrophobicizing, in the form of a stable aqueous emulsion, more preferably as aqueous emulsions having a siloxane content of from 3 to 90% by weight, in particular from 5 to 60% by weight and, with particular preference, from 7 to 40% by weight.

The aqueous emulsions are prepared by the techniques described in DE-A 35 29 865, DE-A 38 00 629 and WO-A 95/22627, for instance by mixing the carboxy-functional siloxane thoroughly with water and with an amine or ammonia or sodium hydroxide solution or potassium hydroxide solution (or a combination of the compounds) at from 0 to 100° C., preferably from 20 to 70° C. In this case, the sequence in which the components are added is inconsequential. The aqueous mixture is subsequently processed in an appropriate homogenizer (for example a slot homogenizer) to form an emulsion. Prior to emulsification, it is also possible to add the emulsifiers and oils set out later on below. These are preferably incorporated prior to homogenization.

As a further additive, oleic acids or fatty acids are added to the emulsion in a concentration of from 0.1 to 5% by weight.

The siloxanes of the formulae I or Ia and IV or IVa are, in particular, linear siloxanes having terminal organic functional groups in which n=2, a=2, b=2, R=R'=R''=$CH_3$, R'''=$OCH_3$ X=—$CH_2$—$CH_2$— Y=—$CH_2CH_2$—, Z=—$CH_2CH_2CH_2$— and p=0 or 1, the other substituents and variables being as already defined. Among the siloxane copolymers of the formula I or Ia and IV or IVa, particular preference is given to linear siloxanes having terminal trimethoxysilyl radicals and lateral organofunctional groups in which n=1 to 5, m=10 to 130, a=1, b=2, R=R'=R''=$CH_3$, R'''=$OCH_3$ X=—$CH_2$—$CH_2$— Y=—$CH_2CH_2$—, Z=—$CH_2CH_2CH_2$— and p=0 or 1 and the other substituents and variables are as defined. Most preferably, p=0.

The siloxanes of the formula I or Ia and IV or IVa, respectively, preferably have molar masses in the range from 3000 to 10,000. Linear, branched or cyclic siloxanes are suitable, the linear or branched siloxanes possibly having silanol, hydrocarbon or triorganosiloxy end groups. In a preferred variant, the linear or branched siloxanes used for hydrophobicizing have end groups of the following formula VI

(VI)

where a=2.

Furthermore, the siloxane copolymers described in formula I or Ia and IV or IVa can have different siloxy units, featuring different quotients of the variables a/n and/or b/m. Thus a siloxane copolymer can, for example, comprise linear units

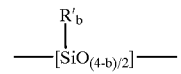

in which b=2. At the same time, it has branching points where b=1.

The same applies to the reproduced siloxane units of the following structure:

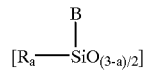

Suitable radicals R, R' or R'' are preferably methyl, phenyl or ethyl radicals; with particular preference R=R'=Me.

The radicals X are preferably the following divalent hydrocarbon radicals: —CH=CH— —CHR$^5$—$CH_2$—, —$CH_2$—CHR$^5$— with R$^5$=$C_{5-15}$-alkenyl or —$CH_2$—$CH_2$—, —C(R$^1$R$^2$)—$CH_2$—, where R$^1$ or R$^2$=—(CH=CH)$_d$(CR$^3$R$^4$)$_k$—Q with $0 \leq d \leq 2$, $0 \leq k \leq 30$, where Q is H or COOH; R$^3$ or R$^4$ is H or $CH_3$ or

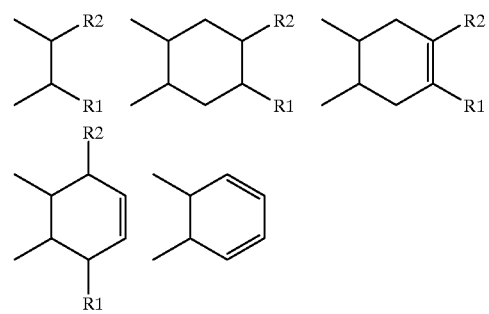

in which R$^1$ and R$^2$ are independent of each other and are H, $C_1$–$C_{30}$-alkyl (linear or branched), for example methyl, ethyl, etc, or $C_2$–$C_{30}$-alkenyl (linear or branched), for example allyl, hexenyl, dodecenyl, etc, or are phenyl or substituted aryl compounds, the substituents preferably being chlorine, alkoxy or acyloxy;

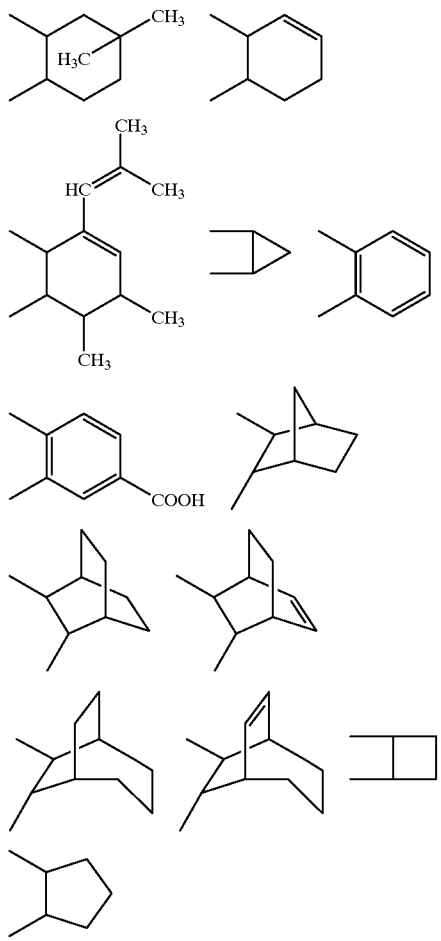

The radicals Y and Z are preferably divalent hydrocarbon radicals such as ethylene, tetramethylene, hexamethylene or octamethylene and/or oxygen-containing divalent hydrocarbons such as —$(CH_2)_2O(CH_2)_2$—, —$(CH_2)_2O(CH_2)_2O(CH_2)_2$— or oligomers or polymers of these compounds. With particular preference X=—$CH_2$—$CH_2$— —$CHR^5$—$CH_2$—, —$CH_2$—$CHR^5$— with $R^5=C_{5-15}$-alkenyl or Z=—$CH_2$—$CH_2$—$CH_2$—. The variable p can be from 0 to 10, but is preferably 0 or 1. Most preferably p=0 and Z=—$CH_2$—$CH_2$—$CH_2$—.

A preferred compound is $(CH_3)_3$ Si—(O—Si$(CH_3)_2)_n$—(O—SiBCH$_3)_m$—OSi$(CH_3)_3$— with B=$CH_2$—$CH_2$—$CH_2$—NH—$CH_2$—$CH_2$—$CH_2NH_2$, especially preferred with a viscosity of approx. 200 mm$^2$/s and an amine number of 0,27. The amino groups are preferably reacted with octenylsuccinic acid anhydride.
A compound (IV) is obtained:

$(CH_3)_3Si$—(O—Si$(CH_3)_2)_n$—(O—SiBCH$_3)_m$—OSi$(CH_3)_3$ with B.

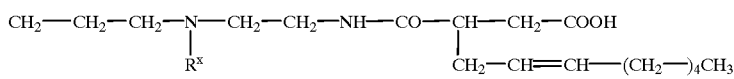

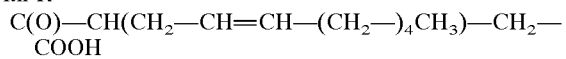

with $R^x$
C(O)—CH(CH$_2$—CH═CH—(CH$_2$—)$_4$CH$_3$)—CH$_2$—COOH

The carboxyl groups of the compounds of formula IV as IVa can exist both as free carboxylic acids or in partial or complete salt form, for example as alkali metal salts, such as sodium salts or potassium salts, as ammonium salts or as alkylammonium salts. In general they are employed in their salt form.

Suitable amines—for the production of alkylammonium salts—are in principle all primary, secondary and tertiary amines. Examples are methylamine, dimethylamine, trimethylamine, ethylamine, diethylamine, triethylamine, primary, secondary or tertiary isopropylamines or other alkylamines, morpholine, aniline, methylaniline, dimethylaniline, piperidine, N-methylpiperidine, tetramethylpiperidine, pentamethylpiperidine, tetramethylpiperidin-4-ol, pentamethylpiperidin-4-ol, ethanolamine, diethanolamine, triethanolamine, propanolamine, 2-amino-2-methyl-propanol.

Hydroxy-functional amines such as triethanolamine, diethanolamine, etc, are particularly suitable if the product is to be used as handle agent.

The hydrophobicizing of leather in accordance with the invention could also be implemented if the aqueous emulsion of the polysiloxane additionally comprises paraffins, which can be solid and/or liquid, for example those having a melting point of from 20 to 100° C., paraffin oils or white oils, mineral oils, natural fats or natural oils, for example fish liver oil or bone oil, or synthetic or natural waxes, for example polyethylene waxes, polyisobutyl waxes, beeswax or carnauba wax, normally in an amount of up to 90% by weight, in particular up to 45% by weight.

Suitable emulsifiers are in principle all compounds, nonionic, anionic, cationic or amphoteric in nature and surface-active in aqueous systems, which provide for sufficient emulsification of the polysiloxanes and paraffins, paraffin oils, fats, oils and waxes employed and do not adversely affect hydrophobicization; those which are particularly suitable, however, are N-(C$_9$- to C$_{20}$-acyl)amino acids having 2 to 6 carbon atoms in the amino acid parent structure, such as N-oleoylsarcosine, N-stearoylsarcosine, N-lauroylsarcosine or N-isononanoylsarcosine; the latter are mostly in the form of their alkali metal, ammonium or trialkanolamine salts or as salts of fatty acids, for example of oleic acid. The polysiloxane emulsion normally comprises from 0.1 to 30% by weight, in particular from 0.2 to 25% by weight and, above all, from 2 to 18% by weight of emulsifiers, it also being possible to employ mixtures of the emulsifiers stated.

In a preferred variant of the present invention the use of emulsifiers is dispensed with because the carboxyamide-polysiloxanes are self-emulsifying.

The polysiloxane emulsions described normally comprise from 3 to 90% by weight, in particular from 5 to 60% by weight and, with particular preference, up to 40% by weight of carboxyl-functionalized polysiloxanes of the formula IV or IVa. The emulsions are normally employed in amounts of from 0.1 to 20% by weight, in particular from 0.5 to 15% by weight, based on the shaved weight of the leather or the wet weight of the furs. It may be advisable to dilute the emulsions described (concentrates) with water in a proportion of from 1:2 to 1:5 and to add this diluted formulation to the operating liquor in the course of hydrophobicizing the leather.

The hydrophobicization according to the invention can be conducted in one stage or else two stages, during or after retanning. Judicious tanning agents for retanning are vegetable retanning agents, for example those based on phenolsulfonic acid-formaldehyde condensates. Examples of suitable dyes which can be used at the same time are the acidic, substantive or basic aniline dyes commonly used.

The actual hydrophobicization according to the invention, during or after retanning, takes place generally with drumming in an appropriate apparatus, ie. at liquor lengths of from 50 to 2000%, preferably from 75 to 400%, based on the shave weight of the leather or wet weight of the furs, at from 20 to 60° C., preferably from 35 to 50° C., the pH, in general, initially being from 4.5 to 8.0, preferably from 4.8 to 5.5. Hydrophobicization is generally over after period of from 20 to 240 minutes, preferably from 30 to 120 minutes.

At the end of hydrophobicization the emulsifier is customarily fixed with acid, preferably formic acid, by establishing a pH of from 3.0 to 5.0, preferably from 3.8 to 4.0.

The hydrophobicizing effect can be reinforced by after treatment with a divalent, trivalent or tetravalent metal salt as is customary in tanning practice, in particular with a basic chromium sulfate, with aluminum sulfate, zirconium sulfate, titanium sulfate, calcium chloride or magnesium sulfate. The amount of these salts which it is judicious to use, based on the shaved weight of the leather or wet weight of the furs, is from 0.5 to 5% by weight, preferably from 1 to 2% by weight. Of the salts stated, basic chromium sulfates and aluminum sulfates are preferred.

A preferred hydrophobicizing composition based on the compounds of formula IV or IVa comprises, based on the amount of the aqueous emulsion,

| | |
|---|---|
| from 1 to 90% by weight | of carboxyamide-polysiloxanes of formula IV or IVa, |
| from 0 to 30% by weight | of emulsifiers, and |
| from 0 to 50% by weight | of paraffins, paraffin oils or white oils, mineral oils, natural fats or natural oils or synthetic or natural waxes. |

It is a major advantage of the present invention that sufficient hydrophobicizing effects are obtained even using, in general, smaller amounts of carboxyl-functionalized polysiloxanes than of the polysiloxane-containing hydrophobicizing compositions known from the prior art.

In addition, the present hydrophobicizing process operates without organic solvents on a purely aqueous basis.

Storage-stable emulsions are obtained even when paraffins or mineral oils are used at the same time.

A further advantage, in the case of the amphoteric carboxyamide-polysiloxanes obtainable by nonstoichiometric reaction with dicarboxylic anhydrides, is the improved acid stability owing to the protonatable amino groups that are still present. At the same time, the good hydrophobicizing effect is retained.

The invention is illustrated in more detail below using examples.

EXAMPLE 1 a) 167 g (0.032 mol) of a siloxane containing about 0.35 mmol/g aminopropyl radicals and having a molar mass of 5200 (SLM 441012/1 from Wacker) were charged to a round-bottom flask, heated to 70° C. and stirred. 6.4 g (0.064 mol) of preground succinic anhydride were added to the siloxane via a powder funnel in such a way that the solid was immediately fluidized by the stirrer and did not stick to the wall or the stirrer. The mixture was then stirred at 70° C. for 2.5 h. During this period, the succinic anhydride reacts completely. The reaction mixture is then cooled to 50° C. According to $^{13}$C-NMR, the reaction product has the following structure:

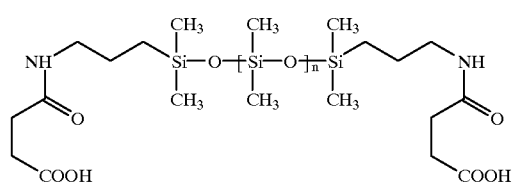

b) 5.85 g of morpholine were dissolved in 818 g of water, and the solution was preheated to 50–60° C. and then introduced with vigorous stirring into the reaction mixture described under (a). Finally, 2 g of oleic acid were added and stirring was continued for about 15 minutes. This was followed by emulsification at 50° C. for about 10 minutes using the Ultraturrax mixer. The resulting emulsion was then processed in a homogenizer to form a stable emulsion. Siloxane concentration: about 18%, pH: about 9.

EXAMPLE 2

A siloxane containing about 0.375 mmol/g 3-(2-aminoethyl)aminopropyl end groups and having an average molar mass of 5400 (IM47 from Wacker) was dissolved together with succinic anhydride [SA] (see table) in 40 g of THF, the components were stirred together and the solution was stirred at 50° C. for 8 h. The THF was subsequently removed under reduced pressure on a rotary evaporator. The IR spectrum indicated complete reaction of the succinic anhydride.

Structure of the product according to $^{13}$C-NMR:

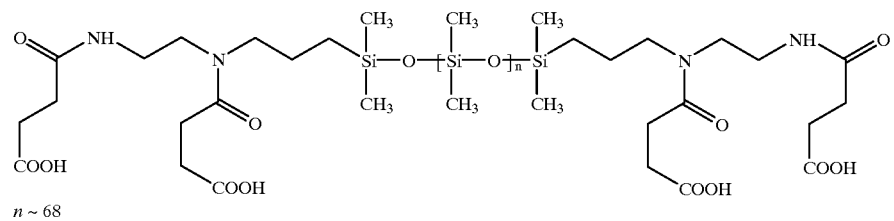

Subsequent processing was as in Example 1b, using ammonia instead of morpholine. Oleic acid was not used in this case.

The following were used to prepare the emulsion:

| Material used | Amount | Proportion in the emulsion |
|---|---|---|
| 3-(2-Aminoethyl)amino-propylsiloxane (IM47) | 108 g | 12.8% |
| SA | 8 g | 0.95% |
| $NH_3$ | 2.1 g | 0.25% |
| $H_2O$ | 728.4 g | 86.0% |

EXAMPLE 3

A siloxane emulsion was prepared in accordance with Example 1 using the following amounts of the specific components. Oleic acid was not used here.

| Material used | Amount | Proportion in the emulsion |
|---|---|---|
| 3-Aminopropylsiloxane (SLM441012/1) | 201.3 g | 19.2% |
| SA | 7.74 g | 0.74% |
| Morpholine | 5.9 g | 0.56% |
| $H_2O$ | 836 g | 79.5% |

EXAMPLE 4

A siloxane emulsion was prepared in accordance with Example 1 using the following amounts of the specific components. Oleic acid was not used here.

| Material used | Amount | Proportion in the emulsion |
|---|---|---|
| 3-Aminopropylsiloxane (SLM441012/1) | 203.1 g | 18.93% |
| SA | 7.8 g | 0.73% |
| $NH_3$ | 1.5 g | 0.14% |
| $H_2O$ | 860.5 g | 80.2% |

EXAMPLE 5

A polydimethylsiloxane containing 3-(2-aminoethyl) aminopropyl side groups (amine number=0.277 meq/g) and trimethylsiloxy end groups and having a molar mass of about 6500 g/mol was reacted with succinic anhydride (SA) in accordance with Example 1 and was processed with water, morpholine and oleic acid to form an emulsion

| Material used | Amount | Proportion in the emulsion |
|---|---|---|
| 3-(2-Aminoethyl)amino propylsiloxane | 270 g | 17.81% |
| SA | 7.5 g | 0.49% |
| $H_2O$ | 1230 g | 81.13% |
| Morpholine | 6.6 g | 0.44% |
| Oleic acid | 2 g | 0.13 |

Structure of the product according to $^{13}$C-NMR:

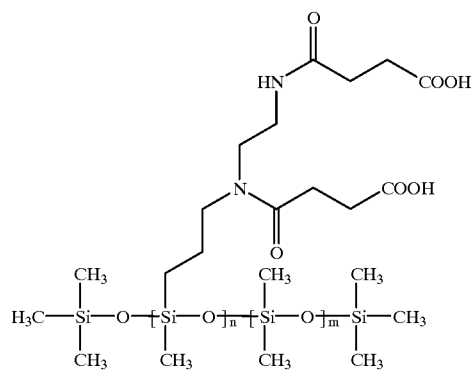

EXAMPLE 6

Preparation of the Carboxy-functional Siloxane:

310 g of a polydimethyl siloxane with 3-(2-aminoethyl) aminopropyl side-groups and trimethyl siloxy end-groups (viscosity approximately 200 mm$^2$/s; amine number: 0.283 meq/g) and 18,45 g n-octenyl succinic acid anhydride were metered in a 21 evaporation flask under argon. The components were mixed by stirring and subsequently stirred for 4 hrs at 40° C.

Preparation of an Aqueous Emulsion:

In a second stirring flask 1520 g water, 16.92 g morpholine and 34.4 g oleic acid were mixed with the prepared carboxy-functional siloxane and subsequently homogenized. A stable emulsion was obtained.

EXAMPLE 7

A carboxy-functional siloxane prepared according to example 6 was added to a mixture of 1520 g water, 13.17 g triethanolamine and 34.7 g Plurafac® LF 120 (non-ionic surfactant based on fatty alcohol alkoxylates) and the mixture was subsequently homogenized. A stable emulsion was obtained.

EXAMPLE 8

A carboxy-functional siloxane prepared according to example 6 was added to a mixture of 1520 g water, 7.71 g morpholine and 34.7 g Lutensol® ON 70 (non-ionic surfactant based on an oxoalcohol prepared by BASF AG). The mixture was subsequently homogenized. A stable emulsion was obtained.

EXAMPLE 9

Preparation of an Aminopolydimethyl Siloxane

To a stirred flask 1 kg of octamethylcyclotetrasiloxane (M=296.62 g/mol), 56.83 g hexamethyldisiloxane (0.35 mol; M=162.38 g/mol) and 32.73 g aminopropyltrimethoxysilane (0.18 mol; M=179.29 g/mol) were added, and 0.3 g KOH (85%; 4.5 mmol; grounded) were added under stirring. The mixture became slightly obscure. After heating to 130° C. the mixture was stirred for 6 hrs at this temperature. Subsequently it was cooled to 80° C. and 0.27 g of acidic acid (4.5 mol) were added under stirring. Stirring was continued for 1 hr at 80° C. Subsequently the mixture was heated to 130° C. and the low boilers were removed under reduced pressure (20 to 30 mbar). 1015 g residue were obtained. 35 g distillate and 17 g distillate were obtained in the subsequent cooling trap. The distillate and the contents of the cooling trap did essentially consist of non-reacted cyclosiloxane and hexamethyldisiloxane. A total conversion was not possible since the reaction is equilibrium reaction.

The analysis of the products gave the following parameters:

Amine number: 0.158 meq/g

Viscosity: 64 mm$^2$/s at 25° C.

The Si-NMR-spectroscopic analysis showed that the siloxane contained the following units:

As end-groups: $(CH_3)_3SiO_{1/2}$ and $CH_3O(CH_3)_2Si$—O in the chain $(CH_3)_2Si(O_{1/2})_2$ as amine residues $R(OCH_3)Si(O_{1/2})_2$ and $RSi(O_{1/2})_3$ with $R=CH_2CH_2CH_2NH_2$.

The amine number was determined according to PH-C 17.2 g of the amino-functional silicone oil were dissolved in 50 ml toluol-propanol-mixture (1:1). 15 ml acetic acid were added. Subsequently titration was carried out with a titro-processor using perchloric acid (0,1 mol/l in acetic acid). A combined pH-electrode with diaphragm, filled inside with lithium chloride saturated in acetic acid, outside filled with lithium perchlorate saturated in acetic acid was employed as electrode. The equivalence point was calculated automatically. The amine number was derived from the product of the perchloric acid (in ml) times 0.1, divided by the amount of amino functional silicone oil (g).

Preparation of the Siloxane Emulsion 1 kg of the aminopolydimethylsiloxane prepared as above was heated to 70° C. under inert gas (Ar or $N_2$). 15.8 g succinic anhydride (equivalent amount, based on the amino groups) was added directly to the aminopolydimethyl siloxane. Stirring was continued for 4 hrs at 70° C. until no further succinic acid anhydride was present. Subsequently the mixture was cooled to 50° C. In a second flask 4.19 kg water, 20 kg morpholine and 11,5 g oleic acid were mixed and heated to 50° C. The siloxane was added to the aqueous solution and homogenized. The emulsion was approximately 20%.

Performance Testing

For the performance test, chrome-tanned wet-blue cattle leather was treated in accordance with the following instructions.

For comparison, the same tanned and dyed leather was hydrophobicized analogously with 2% by weight of Densodrin OF, based on the shaved weight.

Some of the samples (Tables I, II, III; in each case Sample Nos. 1, 3 and 4) were subjected not to customary hydrophobicization (addition option 1) but, after dyeing, to top hydrophobicization (addition option 2).

The conditions for these types of leather treatment are set out below:

| Hydrophobicization and top hydrophobicization | | | | |
|---|---|---|---|---|
| Starting material: | Chrome-tanned wet-blue cattle leather | | | |
| Shaving thickness: | 2.0 mm | | | |
| Percentages base on: | Shaved weight | | | |
| Washing: | 200% | Water 35° C. | 10 min | |
| | | Drain liquor | | |
| Deacidification: | 100% | Water 35° C. | | |
| | 2.0% | Neutrigan P 4 | xx | |
| | 1.3% | Sodium bicarbonate | xx 90 min | |
| | | pH of liquor: about 6 | | |
| | | Cut (BKG): | | |
| | | uniformly | | |
| | | Drain liquor | | |
| Washing: | 200% | Water 35° C. | 10 min | |
| | | Drain liquor | | |
| Retanning: | 75% | Water 35° C. | | |

| -continued | | | | |
|---|---|---|---|---|
| Hydrophobicization and top hydrophobicization | | | | |
| Starting material: | Chrome-tanned wet-blue cattle leather | | | |
| Shaving thickness: | 2.0 mm | | | |
| Percentages base on: | Shaved weight | | | |
| | 3% | Relugan RE | 20 min | |
| | +3% | Mimosa | | |
| | 3% | Relugan D | | |
| | 1% | Relugan S | 20 min | |
| Hydrophobicization: | +8% | Densodrin EN | | |
| Addition option 1: | 2% | Si dispersion of the invention (or Densodrin OF as comparison) | 90 min | |
| | +1.7% | Formic acid, 85% strength 3 × 10 min pH of liquor: 3.7 Drain liquor | +20 min | |
| Washing: | 200% | Water 35° C. Drain liquor | 10 min | |
| Top hydrophobi-cization: | 100% | Water 40° C. | | |
| Addition option 2: | 2% | Si dispersion of the invention (or Densodrin OF as comparison) Drain liquor | 30 min. | |
| Fixing: | 100% | Water 35° C. | 90 min | |
| | 2% | Chromitan FM pH of liquor: 3.7 Drain liquor | | |
| Washing: 2x | 200% | Water 25° C. Drain liquor Set out leather overnight on a trestle, vacuum for 2 min/80° C., hang to dry, condition, stretch, kiss-plate | 10 min | |

The siloxane emulsions prepared in the manner described above in accordance with Example 1 (see Table I below), Example 3 (see Table II below), Example 4 (see Table III below) and in accordance with Example 5 (see Table IV below) were, as described above, compared in respect of their hydrophobicizing effect on leather with comparison emulsions. The measurement parameters used for these investigations were the water absorption in % after certain periods of time had elapsed, and the time required for water penetration, determined by the Bally Penetrometer test in accordance with DIN 53338/IUP 10, and the number of compressions leading to penetration of water, determined by the method of Maeser in accordance with ASTM D 2099-70. The comparison emulsions (see Tables I to IV, in each case samples 1 or 3) each contained the known hydrophobicizing agent Densodrin OF.

Evaluation

As is evident from Table II, when the carboxyamide-polysiloxanes according to Example 3 are used in accordance with the invention as agents for hydrophobicizing leather, the properties of the leather thus treated are at least equal to those of leather treated with the known hydrophobicizing agent Densodrin OF, measured by water penetration and water absorption. The use of the known hydrophobicizing agent is, however, associated with greater cost.

From Table III, moreover, it is evident that, when the carboxyamide-polysiloxanes according to Example 4 are used in accordance with the invention, the properties obtained are just as good as when using the known hydrophobicizing agent Densodrin OF. Moreover, in this case too the use of the carboxyamide-polysiloxane is substantially more cost-effective.

Table IV shows that, when the carboxyamide-polysiloxanes according to Example 5 are used in accordance with the invention, the number of Maeser compressions leading to water penetration is increased by about 50% relative to the control. This means that the leather hydrophobicized in accordance with the invention becomes water-permeable only after a number of compressions higher by 50% than that of the control.

A further factor is that the leathers obtained by hydrophobicization with carboxyamide-polysiloxanes of formula IV, used in accordance with the invention, have a pleasantly soft and silky handle.

TABLE I

Bally Penetrometer test in accordance with DIN 53338/IUP 10
Type of leather: Upper leather

| Sample designation* | Compression in % | Roughened | Water penetration after: | Water absorption in % after | | | | Maeser compressions |
|---|---|---|---|---|---|---|---|---|
| | | | | 1 h | 3 h | 6 h | 24 h | |
| 1 | 15 | no | none after 6 h | 11 | 17 | 20 | — | 3000 |
| 1 repet. | 15 | no | 5 h | 10 | 17 | 21 | — | — |
| 2 | 15 | no | none after 6 h | 11 | 17 | 22 | — | 1000 |
| 2 repet. | 15 | no | 6 h | 10 | 16 | 19 | — | — |
| 3 | 15 | no | 120 min | 12 | 24 | 34 | — | 500 |
| 3 repet. | 15 | no | 180 min | 11 | 24 | 32 | — | — |
| 4 | 15 | no | 90 min | 12 | 29 | 43 | — | 3700 |
| 4 repet. | 15 | no | 120 min | 12 | 25 | 35 | — | — |

1. 1 repet.: Comparison example with Densodrin OF + 8% Densodrin EN
2. 2 repet.: Example 1 + 8% Densodrin EN
3. 3 repet.: Comparison Example with Densodrin OF, top-hydrophobicized
4. 4 repet.: Example 1, top-hydrophobicized

TABLE II

Bally Penetrometer test in accordance with DIN 53338/IUP 10
Type of leather: Upper leather

| Sample designation* | Compression in % | Roughened | Water penetration after minutes | Water absorption in % after | | | | Maeser compressions |
|---|---|---|---|---|---|---|---|---|
| | | | | 1 h | 3 h | 6 h | 24 h | |
| 1 | 15 | no | none | 8 | 15 | 18 | 34 | — |
| 1 repet. | 15 | no | none | 8 | 14 | 18 | 22 | — |
| 2 | 15 | no | after 24 h | 8 | 15 | 19 | 26 | — |
| 2 repet. | 15 | no | after 24 h | 8 | 14 | 17 | 24 | — |
| 3 | 15 | no | 150 | 9 | 17 | 24 | 34 | — |
| 3 repet. | 15 | no | 140 | 9 | 16 | 21 | 25 | — |
| 4 | 15 | no | 120 | 11 | 22 | 29 | 37 | — |
| 4 repet. | 15 | no | 120 | 11 | 21 | 28 | 36 | — |

1. 1 repet.: Comparison example with Densodrin OF + 8% Densodrin EN
2. 2 repet.: Example 3 + 8% Densodrin EN
3. 3 repet.: Comparison example with Densodrin OF, top-hydrophobicized
4. 4 repet.: Example 3, top-hydrophobicized

TABLE III

Bally Penetrometer test in accordance with DIN 53338/IUP 10
Type of leather: Upper leather

| Sample designation* | Compression in % | Roughened | Water penetration after minutes | Water absorption in % after 1 h | 3 h | 6 h | 24 h | Maeser compressions |
|---|---|---|---|---|---|---|---|---|
| 1 | 15 | no | none | 12 | 16 | 25 | 34 | — |
| 1 repet. | 15 | no | 360 | 11 | 16 | 22 | 29 | — |
| 2 | 15 | no | 360 | 10 | 15 | 20 | 26 | — |
| 2 repet. | 15 | no | 180 | 11 | 16 | 24 | 32 | — |
| 3 | 15 | no | none | 11 | 15 | 22 | 31 | — |
| 3 repet. | 15 | no | none | 10 | 15 | 21 | 27 | — |
| 4 | 15 | no | 150 | 13 | 21 | 28 | 3i | — |
| 4 repet. | 15 | no | 150 | 10 | 19 | 27 | 35 | — |

1. 1 repet.: Comparison example with Densodrin OF + 8% Densodrin EN
2. 2 repet.: Example 4 + 8% Densodrin EN
3. 3 repet.: Comparison example with Densodrin OF, top-hydrophobicized
4. 4 repet.: Example 4, top-hydrophobicized

TABLE IV

Bally Penetrometer test in accordance with DIN 53338/IUP 10
Type of leather: Upper leather

| Sample designation* | Compression in % | Roughened | Water penetration after minutes | Water absorption in % after 1 h | 3 h | 6 h | 24 h | Maeser compressions |
|---|---|---|---|---|---|---|---|---|
| 1 | 15 | no | none after 6 h | 6 | 11 | 18 | — | 14,600 |
| 2 | 15 | no | none after 6 h | 6 | 10 | 14 | — | >20,000 |

1. Comparison example with Densodrin OF + 8% Densodrin EN
2. Example 5 + 8% Densodrin EN The performance testing of the emulsion of example 6 to non roughened leather in comparison to Densodrin OF gave the following result:

| product employed | compression % | Bally-Penetrometer-Test water penetration after | water absorption in % after 1 h | 3 h | 6 h | 24 h | Maeser-test number of Compressions (MW) |
|---|---|---|---|---|---|---|---|
| compar. 6 | 15 | >24 h. | 4 | 6 | 7 | 8 | 35000 |
| Vergleich | 15 | >24 h. | 3 | 6 | 7 | 8 | 23000 |

The performance testing of the emulsion of examples 7 and 8 to non roughened leather in comperison to Densodrin OF gave the following result:

| product employed | compression % | Bally-Penetrometer-Test water penetration after | water absorption in % after 1 h | 3 h | 6 h | 24 h | Maeser-test number of Compressions (MW) |
|---|---|---|---|---|---|---|---|
| compar. 7 | 15 | >24 h. | 5 | 6 | 9 | 9 | 65000 |

-continued

| product employed | compression % | Bally-Penetrometer-Test water penetration after | water absorption in % after 1 h | 3 h | 6 h | 24 h | Maeser-test number of Compressions (MW) |
|---|---|---|---|---|---|---|---|
| compar. 8 | 15 | >24 h. | 3 | 6 | 8 | 8 | 20000 |
| compar. | 15 | >24 h. | 3 | 6 | 7 | 8 | 16000 |

Stability after dilution with hard water (emulsion/water= 1/10)

| product employed | stable against hard water up to |
|---|---|
| Ex. 6 | 20° dH |
| Ex. 7 | >60° dH |
| Ex. 8 | >60° dH |
| Densotrin OF | 15° dH |

The products showed an effect similar to Densotrin OF in the Bally-penetrometer test.

In the Maeser test an improved effect was found compared to Densotrin OF. The hard water stability of the product was much better than that of Densotrin OF.

Performance Test of the Emulsion of Example 9

The emulsion was tested on light brown leather. For comparison Densotrin OF was used for hydrophobizing.

The hard water stability of the emulsion was more than 60°dH, compared to less than 15°dH for Densotrin OF. Despite smaller amounts of oleic acid (0,2%) a good emulsion stability was obtained.

The results of the Bally-penetrometer-test are shown in the following table:

| product employed | compression in % | water entry roughened | water absorption in % after | | | |
|---|---|---|---|---|---|---|
| | | | 1 h. | 3h. | 6 h. | 24 h. |
| Dens. OF | 15 | no | >6 h. | 6 | 10 | 13 | — |
| Ex. 9 | 15 | no | >6 h. | 6 | 11 | 13 | — |

We claim:

1. A method for hydrophobicizing leather or fur skins, involving the step of treating the leather or fur skins with carboxyamide-polysiloxanes of the formula IV

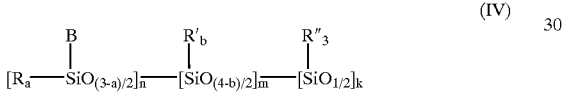

(IV)

in which R, R', and R", each independently, are selected from $C_{1-6}$-alkyl or phenyl, or carboxyamide-polysiloxanes of the formula IVa

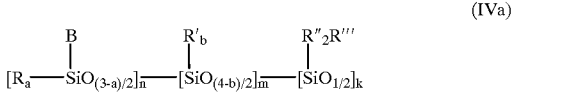

(IVa)

wherein R' and R", each independently, are selected from $C_{1-6}$-alkyl, $C_{1-6}$-alkoxy, OH or phenyl, and R'" is $OCH_3$ and the number of types of structural units defined by

is at least one and a is selected from the range $0 \leq a \leq 2$ and b is selected from the range $1 \leq b \leq 3$, and the number of repetitions of the types of structural units which is defined by the variables m, n and k is selected from the ranges $1 \leq n \leq 60$, $20 \leq m \leq 800$ and $0 \leq k \leq \{(2-b)m+[(1-a)n+2]\}$ and B is an organic radical of the formula V

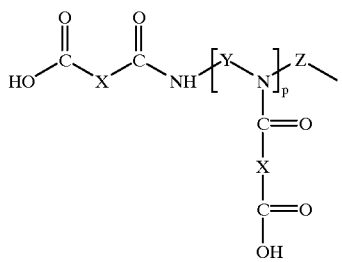

(V)

in which p=0–10 and each of Y and Z, independently, is a divalent aliphatic hydrocarbon radical or is a divalent alkoxyalkyl radical, and X is a divalent hydrocarbon radical from the group of —$(CH_2)_y$— where $2 \leq y \leq 6$, $CH_2$—$CHR^5$—, —$CHR^5$—$C_2H$—, cyclic or bicyclic, saturated of unsaturated hydrocarbon radicals or aromatic hydrocarbon radicals and —CH=CH— wherein $R^5$ is $C_{1-20}$ alkyl or $C_{2-20}$ -alkenyl, where optionally some of the substituents B are replaced by the substituents A of the following formula II

(II)

in which Y, p and Z are as defined above, or by the substituents C of the following formula

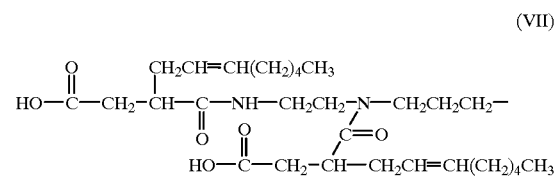

(VII)

the carboxyamide-polysiloxanes of the above formula IV or IVA having a carboxyl content of from 0.02 to 1.0 mmol/g and an average molar mass (number average)$M_n$ in the range from $2 \times 10^3$ to $60 \times 10^3$ gmol.

2. The method as claimed in claim 1, where B is an organic radical of the formula V,

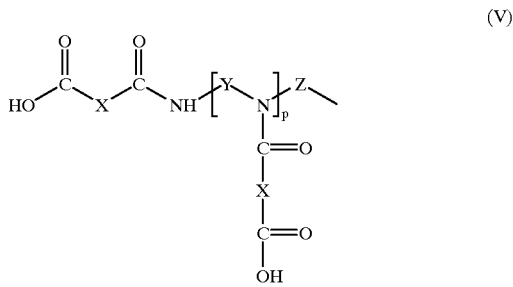

(V)

in which p=0 or 1, X=—$CH_2CH_2$—, —$CH_2$—$CHR^5$— or —$CHR^5$—$CH_2$— with $R^5$ $C_{1-20}$-alkyl or $C_{2-20}$-alkenyl, —CH=CH— or

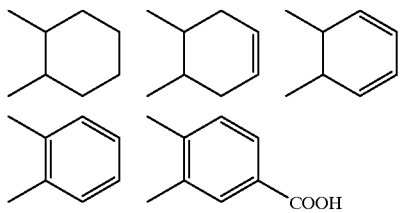

and Y=—$CH_2CH_2$— and Z=—$CH_2CH_2CH_2$—.

3. The method as claimed in claim 1, where the carboxyamide-polysiloxane has a carboxyl content from 0.2 to 0.5 mmol/g and the average molar mass (number average) is in the range from 3000 to 10,000 g/mol.

4. The method as claimed in claim 1, where X is —CH=CH—, —$CH_2$—$CHR^5$— or —$CHR^5$—$CH_2$— with $R^5$ $C_{1-20}$-alkyl or $C_{2-20}$-alkenyl or —$CH_2$—$CH_2$—.

5. The process of claim 1, in which said carboxyamide-polysiloxanes are applied in the form of an aqueous emulsion off from 1 to 90% by weight of the carboxyamide-polysiloxane, from 0.1 to 30% by weight of emulsifier, and from 0 to 50% by weight of paraffin, paraffin oil, mineral oils, natural fats or oils or synthetic or natural waxes, and said aqueous emulsion is allowed to act, with or without the simultaneous implementation of mechanical treatment steps, at from 20 to 60° C. at a pH of from 0.5 to 8.0 and liquor lengths of from 50% to 2000% and said leather or fur skins are washed and dried.

6. A composition suitable for hydrophobicizing leather or fur skins which comprises an aqueous emulsion of 1 to 90% by weight of carboxyamide-polysiloxanes of the formula IV (IV)

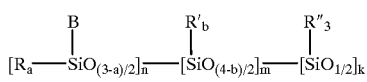

in which R, R', and R", each independently, are selected from $C_{1-6}$-alkyl or phenyl, or carboxyamide-polysiloxanes of the formula IVa (IVa)

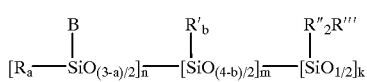

wherein R' and R", each independently, are selected from $C_{1-6}$-alkyl, $C_{1-6}$-alkoxy, OH or phenyl, and R'" is $OCH_3$ and the number of types of structural units defined by

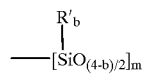

is at least one and a is selected from the range $0 \leq a \leq 2$ and b is selected from the range $1 \leq b \leq 3$, and the number of repetitions of the types of structural units which is defined by the variables m, n and k is selected from the ranges $1 \leq n \leq 60$, $20 \leq m \leq 800$ and $0 \leq k \leq \{(2-b)m+[(1-a)n+2]\}$ and B is an organic radical of the formula V (V)

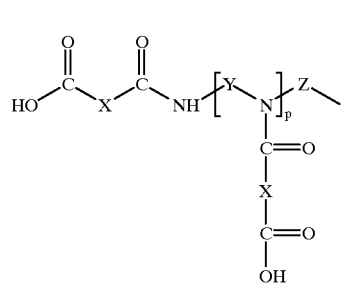

in which p=0–10 and each of Y and Z, independently, is a divalent aliphatic hydrocarbon radical or is a divalent alkoxyalkyl radical, and X is a divalent hydrocarbon radical from the group of —$(CH_2)_y$— where $2 \leq y \leq 6$, $CH_2$—$CHR^5$—, —$CHR^5$—$CH_2$—, cyclic or bicyclic, saturated of unsaturated hydrocarbon radicals or aromatic hydrocarbon radicals and —CH=CH— wherein $R^5$ is $C_{1-20}$ alkyl or $C_{2-20}$-alkenyl, where optionally some of the substituents B are replaced by the substituents A of the following formula II (II)

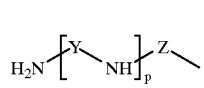

in which Y, p and Z are as defined above, or the substituents C of the following formula (VII)

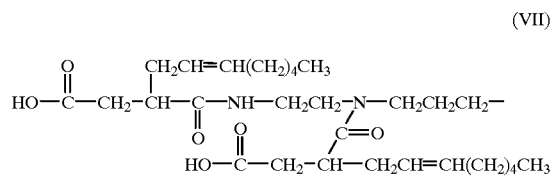

the carboxyamide-polysiloxanes of the above formula IV or IVA having a carboxyl content of from 0.02 to 1.0 mmol/g and an average molar mass (number average) in the range from $2 \times 10^3$ to $60 \times 10^3$ gmol, 0.1 to 30% by weight of an emulsifier, and 0 to 50% by weight paraffin, paraffin oil, mineral oils, natural fats or oils or synthetic or natural waxes.

* * * * *

UNITED STATES PATENT AND TRADEMARK OFFICE
CERTIFICATE OF CORRECTION

PATENT NO.: 6,110,230

DATED: August 29, 2000

INVENTOR(S): FRIEDRICH et al.

It is certified that error appears in the above-identified patent and that said Letters Patent is hereby corrected as shown below:

Col. 23, claim 5, line 20, "off" should be --of--.

Signed and Sealed this

First Day of May, 2001

*Attest:*

NICHOLAS P. GODICI

*Attesting Officer*    *Acting Director of the United States Patent and Trademark Office*